US010979990B2

(12) United States Patent
Srivastava et al.

(10) Patent No.: US 10,979,990 B2
(45) Date of Patent: Apr. 13, 2021

(54) SEAMLESS LINK TRANSFERS BETWEEN PRIMARY AND SECONDARY DEVICES

(71) Applicant: QUALCOMM Incorporated, San Diego, CA (US)

(72) Inventors: Dishant Srivastava, Bangalore (IN); Steven Singer, Cambridge (GB); Robin Heydon, Cambridge (GB); Mayank Batra, Cambridge (GB); Joel Linsky, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 16/421,216

(22) Filed: May 23, 2019

(65) Prior Publication Data
US 2020/0374820 A1 Nov. 26, 2020

(51) Int. Cl.
*H04W 56/00* (2009.01)
*H04W 28/02* (2009.01)
*H04L 5/00* (2006.01)
*H04W 4/80* (2018.01)
*H04W 84/20* (2009.01)

(52) U.S. Cl.
CPC ......... *H04W 56/001* (2013.01); *H04L 5/0055* (2013.01); *H04W 4/80* (2018.02); *H04W 28/021* (2013.01); *H04W 84/20* (2013.01)

(58) Field of Classification Search
None
See application file for complete search history.

(56) References Cited

U.S. PATENT DOCUMENTS

| | | | | |
|---|---|---|---|---|
| 10,631,363 | B1* | 4/2020 | Xian | H04W 52/0251 |
| 2013/0260687 | A1* | 10/2013 | Paycher | H04W 72/1215 455/41.2 |
| 2019/0103899 | A1* | 4/2019 | Lee | G06F 1/1605 |
| 2020/0053612 | A1* | 2/2020 | Jorgovanovic | H04M 1/7253 |
| 2020/0107262 | A1* | 4/2020 | Shaw | H04W 52/0209 |

* cited by examiner

*Primary Examiner* — Eunsook Choi
(74) *Attorney, Agent, or Firm* — Holland & Hart LLP/Qualcomm

(57) ABSTRACT

Methods, systems, and devices for wireless communications at a wireless audio device are described. A first (e.g., primary) wireless audio device may initiate a role switch procedure with a second (e.g., secondary) wireless audio device. The first wireless audio device may disable traffic flow between the source device and the first wireless audio device and transmit synchronization information and timing information necessary for taking over the role of primary wireless audio device to the second wireless audio device. The first wireless audio device may transmit a device role switch message, and the first wireless audio device and the second wireless audio device may perform the role switch. After performing the role switch, the first wireless audio device may assume the role of a secondary wireless audio device and the second wireless audio device may assume the role of a primary wireless audio device.

17 Claims, 10 Drawing Sheets

SEAMLESS LINK TRANSFERS BETWEEN PRIMARY AND SECONDARY DEVICES

BACKGROUND

The following relates generally to wireless communications at a wireless audio device, and more specifically to seamless link transfers between primary and secondary devices.

In some examples of wireless communication, a source device (also referred to as a host device) may communicate via an active link with a primary wireless audio device, and a secondary wireless audio device may shadow the link via relay from the primary bud or by sniffing air traffic. However, in some use cases, a link between the primary earbud and the source device may be disconnected, and a reconnection between the source device and the secondary earbud may occur during runtime, causing a glitch or an audio pause.

SUMMARY

The described techniques relate to improved methods, systems, devices, and apparatuses that support seamless link transfers between primary and secondary devices. In some examples, a first wireless audio device (e.g., a wireless audio device acting in the role of a primary wireless audio device) may initiate a role switch procedure without sending any indication of the device role switch to a source device (e.g., a cell phone). The first wireless audio device may disable traffic flow between the source device and the first wireless audio device. Upon disabling traffic, the first wireless audio device may transmit synchronization information and timing information necessary for taking over the role of primary wireless audio device. When all relevant information has been transmitted to the second wireless audio device, the first wireless audio device may transmit a device role switch message indicating a device role switch between the first wireless audio device and the second wireless audio device. In accordance with the device role switch message, the first wireless audio device and the second wireless audio device may perform the role switch. Upon performing the role switch, the first wireless audio device may assume the role of a secondary wireless audio device and the second wireless audio device may assume the role of a primary wireless audio device.

A method of wireless communications at a first wireless audio device is described. The method may include disabling a traffic flow between a source device and the first wireless audio device, transmitting, based on disabling the traffic flow, synchronization information and timing information to a second wireless audio device, transmitting, based on transmitting the synchronization information and the timing information, a device role switch message indicating a device role switch between the first wireless audio device and the second wireless audio device, performing, based on the device role switch message, the role switch, and sniffing, based on the role switch, air traffic from the source device to the second wireless audio device.

An apparatus for wireless communications at a first wireless audio device is described. The apparatus may include a processor, memory in electronic communication with the processor, and instructions stored in the memory. The instructions may be executable by the processor to cause the apparatus to disable a traffic flow between a source device and the first wireless audio device, transmit, based on disabling the traffic flow, synchronization information and timing information to a second wireless audio device, transmit, based on transmitting the synchronization information and the timing information, a device role switch message indicating a device role switch between the first wireless audio device and the second wireless audio device, perform, based on the device role switch message, the role switch, and sniff, based on the role switch, air traffic from the source device to the second wireless audio device.

Another apparatus for wireless communications at a first wireless audio device is described. The apparatus may include means for disabling a traffic flow between a source device and the first wireless audio device, transmitting, based on disabling the traffic flow, synchronization information and timing information to a second wireless audio device, transmitting, based on transmitting the synchronization information and the timing information, a device role switch message indicating a device role switch between the first wireless audio device and the second wireless audio device, performing, based on the device role switch message, the role switch, and sniffing, based on the role switch, air traffic from the source device to the second wireless audio device.

A non-transitory computer-readable medium storing code for wireless communications at a first wireless audio device is described. The code may include instructions executable by a processor to disable a traffic flow between a source device and the first wireless audio device; transmit, based on disabling the traffic flow, synchronization information and timing information to a second wireless audio device; transmit, based on transmitting the synchronization information and the timing information, a device role switch message indicating a device role switch between the first wireless audio device and the second wireless audio device; perform, based on the device role switch message, the role switch; and sniff, based on the role switch, air traffic from the source device to the second wireless audio device.

Some examples of the method, apparatuses, and non-transitory computer-readable medium described herein may further include operations, features, means, or instructions for identifying a role switch trigger, where disabling traffic flow may be based on identifying the role switch trigger.

In some examples of the method, apparatuses, and non-transitory computer-readable medium described herein, the role switch trigger includes a physical distance between the first wireless audio device and the source device satisfying a threshold, a power balance between the first wireless audio device and the source device satisfying a threshold, a link quality between the first wireless audio device and the source device satisfying a threshold, or a combination thereof.

In some examples of the method, apparatuses, and non-transitory computer-readable medium described herein, disabling traffic flow further may include operations, features, means, or instructions for identifying a gap period during which no communication may be expected from the source device, and disabling the traffic flow during the gap period.

In some examples of the method, apparatuses, and non-transitory computer-readable medium described herein, the gap period includes a coexistence window during which the source device performs wireless communication with another device, via another wireless communication protocol, or a combination thereof.

In some examples of the method, apparatuses, and non-transitory computer-readable medium described herein, disabling traffic flow further may include operations, features, means, or instructions for receiving one or more data packets from the source device, and sending one or more negative acknowledgement (NACK) messages to the source device in response to the one or more data packets.

In some examples of the method, apparatuses, and non-transitory computer-readable medium described herein, disabling traffic flow further may include operations, features, means, or instructions for receiving one or more data packets from the source device, and refraining from sending an acknowledgement (ACK) message to the source device in response to the one or more data packets.

Some examples of the method, apparatuses, and non-transitory computer-readable medium described herein may further include operations, features, means, or instructions for transmitting the device role switch message may be based on the control state information.

In some examples of the method, apparatuses, and non-transitory computer-readable medium described herein, the control state information includes Bluetooth upper layer information, data structure information, or a combination thereof.

In some examples of the method, apparatuses, and non-transitory computer-readable medium described herein, performing the role switch further may include operations, features, means, or instructions for assuming a Bluetooth device address previously corresponding to the second wireless audio device and releasing a Bluetooth device address previously associated with the first wireless audio device, assuming a Bluetooth slave role previously held by the second wireless audio device and releasing a Bluetooth master device role previously held by the first wireless audio device, and releasing an asynchronous connection-less (ACL) connection with the source device and an extended synchronous connection oriented (eSCO) connection with the source device.

In some examples of the method, apparatuses, and non-transitory computer-readable medium described herein, the device role switch message includes a single message, and performing the role switch occurs instantaneously.

In some examples of the method, apparatuses, and non-transitory computer-readable medium described herein, the device role switch message includes a set of messages, and where performing the role switch occurs incrementally in response to the set of messages.

A method of wireless communications between a first wireless audio device and a second wireless audio device at the second wireless audio device is described. The method may include sniffing air traffic between a source device and the first wireless audio device, receiving, from the first wireless audio device, synchronization information and timing information, receiving, based on receiving the synchronization information and timing information, a device role switch message from the first wireless audio device, the device role switch message indicating a device role switch between the second wireless audio device and the first wireless audio device, performing, based on the device role switch message, the role switch, and enabling a traffic flow between the source device and the second wireless audio device.

An apparatus for wireless communications between a first wireless audio device and a second wireless audio device at the second wireless audio device is described. The apparatus may include a processor, memory in electronic communication with the processor, and instructions stored in the memory. The instructions may be executable by the processor to cause the apparatus to sniff air traffic between a source device and the first wireless audio device, receive, from the first wireless audio device, synchronization information and timing information, receive, based on receiving the synchro-nization information and timing information, a device role switch message from the first wireless audio device, the device role switch message indicating a device role switch between the second wireless audio device and the first wireless audio device, perform, based on the device role switch message, the role switch, and enable a traffic flow between the source device and the second wireless audio device.

Another apparatus for wireless communications between a first wireless audio device and a second wireless audio device at the second wireless audio device is described. The apparatus may include means for sniffing air traffic between a source device and the first wireless audio device, receiving, from the first wireless audio device, synchronization information and timing information, receiving, based on receiving the synchronization information and timing information, a device role switch message from the first wireless audio device, the device role switch message indicating a device role switch between the second wireless audio device and the first wireless audio device, performing, based on the device role switch message, the role switch, and enabling a traffic flow between the source device and the second wireless audio device.

A non-transitory computer-readable medium storing code for wireless communications between a first wireless audio device and a second wireless audio device at the second wireless audio device is described. The code may include instructions executable by a processor to sniff air traffic between a source device and the first wireless audio device, receive, from the first wireless audio device, synchronization information and timing information, receive, based on receiving the synchronization information and timing information, a device role switch message from the first wireless audio device, the device role switch message indicating a device role switch between the second wireless audio device and the first wireless audio device, perform, based on the device role switch message, the role switch, and enable a traffic flow between the source device and the second wireless audio device.

Some examples of the method, apparatuses, and non-transitory computer-readable medium described herein may further include operations, features, means, or instructions for receiving the device role switch message may be based on the control state information.

In some examples of the method, apparatuses, and non-transitory computer-readable medium described herein, the control state information includes Bluetooth upper layer information, data structure information, or a combination thereof.

In some examples of the method, apparatuses, and non-transitory computer-readable medium described herein, performing the role switch further may include operations, features, means, or instructions for assuming a Bluetooth device address previously corresponding to the first wireless audio device and releasing a Bluetooth device address previously associated with the second wireless audio device, releasing a Bluetooth slave role previously held by the second wireless audio device and assuming a Bluetooth master device role previously held by the first wireless audio device, and assuming an ACL connection with the source device and an eSCO connection with the source device.

In some examples of the method, apparatuses, and non-transitory computer-readable medium described herein, the device role switch message includes a single message, and performing the role switch occurs instantaneously.

In some examples of the method, apparatuses, and non-transitory computer-readable medium described herein, the device role switch message includes a set of messages, and where performing the role switch occurs incrementally in response to the set of messages.

DETAILED DESCRIPTION

In some examples of wireless communication, a source device (also referred to as a host device) may communicate via an active link with a primary wireless audio device, and a secondary wireless audio device may shadow the link via relay from the primary bud or by sniffing air traffic. However, in some use cases, a link between the primary earbud and the source device may be disconnected, and a re-connection between the source device and the secondary earbud may occur during runtime. This may result in a glitch or an audio pause.

In some examples, a first wireless audio device (e.g., a wireless audio device acting in the role of a primary wireless audio device) may initiate a role switch procedure without sending any indication of the device role switch to a source device (e.g., a cell phone). The first wireless audio device may disable traffic flow between the source device and the first wireless audio device. Upon disabling traffic, the first wireless audio device may transmit synchronization information and timing information necessary for taking over the role of primary wireless audio device. When all relevant information has been transmitted to the second wireless audio device, the first wireless audio device may transmit a device role switch message indicating a device role switch between the first wireless audio device and the second wireless audio device. After the first wireless audio device transmits the device role switch message, the first wireless audio device and the second wireless audio device may perform the role switch. After performing the role switch, the first wireless audio device may assume the role of a secondary wireless audio device and the second wireless audio device may assume the role of a primary wireless audio device.

Aspects of the disclosure are initially described in the context of a wireless communications system. Aspects of the disclosure are further illustrated by and described with reference to timelines, and process flows. Aspects of the disclosure are further illustrated by and described with reference to apparatus diagrams, system diagrams, and flowcharts that relate to seamless link transfers between primary and secondary devices.

Figure 1:
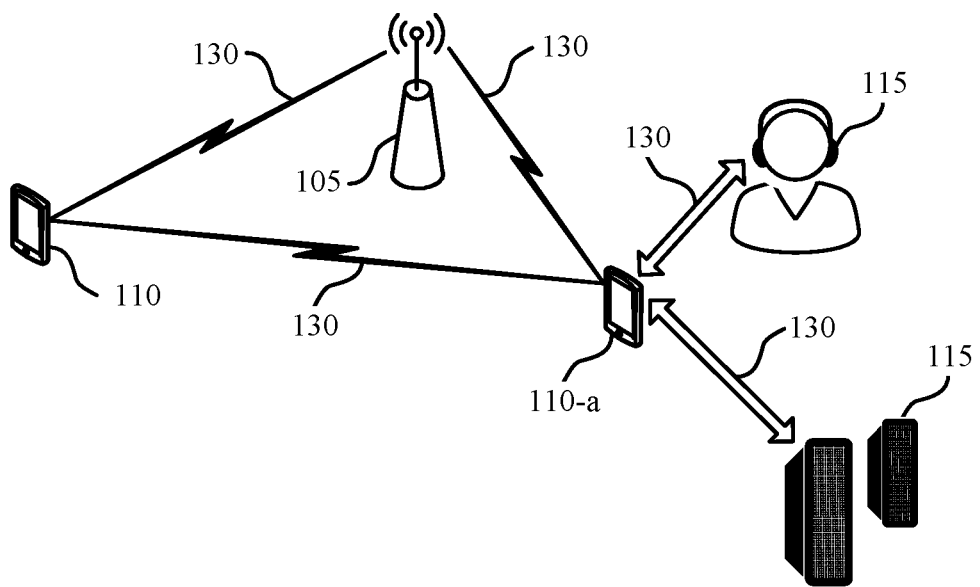
FIG. 1 illustrates an example of a system for wireless communications at a wireless audio device that supports seamless link transfers between primary and secondary devices in accordance with aspects of the present disclosure.

FIG. 1 illustrates a wireless communication system 100 (e.g., which may include to refer to or include a wireless personal area network (PAN), a wireless local area network (WLAN), a Wi-Fi network) configured in accordance with various aspects of the present disclosure. The wireless communication system 100 may include an AP 105, devices (e.g., source devices 110), and paired devices (e.g., wireless audio devices 115) implementing WLAN communications (e.g., Wi-Fi communications) and/or Bluetooth communications. For example, source devices 110 may include cell phones, mobile stations, personal digital assistant (PDAs), other handheld devices, netbooks, notebook computers, tablet computers, laptops, or some other suitable terminology. Paired devices (e.g., wireless audio devices 115) may include Bluetooth devices capable of pairing with other Bluetooth devices (e.g., such as source devices 110), which may include wireless headsets, wireless audio devices, ear pieces, headphones, display devices (e.g., TVs, computer monitors), microphones, meters, valves, etc.

Bluetooth communications may refer to a short-range communication protocol and may be used to connect and exchange information between source devices 110 and wireless audio devices 115 (e.g., between mobile phones, computers, digital cameras, wireless headsets, wireless audio devices, keyboards, mice or other input peripherals, and similar devices). Bluetooth systems (e.g., aspects of wireless communication system 100) may be organized using a master-slave relationship employing a time division duplex protocol having, for example, defined time slots of 625 mu secs, in which transmission alternates between the master device (e.g., a source device 110) and one or more slave devices (e.g., paired devices such as wireless audio devices 115). In some cases, a source device 110 may generally refer to a master device, and a wireless audio device 115 may refer to a slave device in a PAN. As such, in some cases, a device may be referred to as either a source device 110 or a wireless audio device 115 based on the Bluetooth role configuration of the device. That is, designation of a device as either a source device 110 or a wireless audio device 115 may not necessarily indicate a distinction in device capability, but rather may refer to or indicate roles held by the device in the PAN. Generally, source device 110 may refer to a wireless communication device capable of wirelessly exchanging data signals with another device, and wireless audio device 115 may refer to a device operating in a slave role, or to a short-range wireless device capable of exchanging data signals with the mobile device (e.g., using Bluetooth communication protocols).

A Bluetooth device may be compatible with certain Bluetooth profiles to use desired services. A Bluetooth profile may refer to a specification regarding an aspect of Bluetooth-based wireless communications between devices. That is, a profile specification may refer to a set of instructions for using the Bluetooth protocol stack in a certain way, and may include information such as suggested user interface formats, particular options and parameters at each layer of the Bluetooth protocol stack, etc. For example, a Bluetooth specification may include various profiles that define the behavior associated with each communication endpoint to implement a specific use case. Profiles may thus generally be defined according to a protocol stack that promotes and allows interoperability between endpoint devices from different manufacturers through enabling applications to discover and use services that other nearby Bluetooth devices may be offering. The Bluetooth specification defines device role pairs that together form a single use case called a profile. One example profile defined in the Bluetooth specification is the Handsfree Profile (HFP) for voice telephony, in which one device implements an Audio Gateway (AG) role and the other device implements a Handsfree (HF) device role. Another example is the Advanced Audio Distribution Profile (A2DP) for high-quality audio streaming, in which one device (e.g., source device 110-*a*) implements an audio host device (SRC) role and another device (e.g., wireless audio device 115) implements an audio sink device (SNK) role.

For a commercial Bluetooth device that implements one role in a profile to function properly, another device that implements the corresponding role must be present within the radio range of the first device. For example, in order for an HF device such as a Bluetooth headset to function according to the Handsfree Profile, a device implementing the AG role (e.g., a cell phone) must be present within radio range. Likewise, in order to stream high-quality mono or stereo audio according to the A2DP, a device implementing the SNK role (e.g., Bluetooth headphones or Bluetooth wireless audio devices) must be within radio range of a device implementing the SRC role (e.g., a stereo music player).

The Bluetooth specification defines a layered data transport architecture and various protocols and procedures to handle data communicated between two devices that implement a particular profile use case. For example, various logical links are available to support different application data transport requirements, with each logical link associated with a logical transport having certain characteristics (e.g., flow control, acknowledgement/repeat mechanisms, sequence numbering, scheduling behavior, etc.). The Bluetooth protocol stack is split in two parts: a "controller stack" containing the timing critical radio interface, and a "host stack" dealing with high level data. The controller stack is generally implemented in a low-cost silicon device containing the Bluetooth radio and a microprocessor. The controller stack may be responsible for setting up communication links 130 such as asynchronous connection-less (ACL) links, synchronous connection orientated (SCO) links, etc. Further, the controller stack may implement link management protocol (LMP) functions, low energy link layer (LE LL) functions, etc. The host stack is generally implemented as part of an operating system, or as an installable package on top of an operating system. The host stack may be responsible for logical link control and adaptation protocol (L2CAP) functions, Bluetooth network encapsulation protocol (BNEP) functions, service discovery protocol (SDP) functions, etc. In some cases, the controller stack and the host stack may communicate via a host controller interface (HCI). In other cases, (e.g., for integrated devices such as Bluetooth headsets), the host stack and controller stack may be run on the same microprocessor to reduce mass production costs. For such "hostless systems," the HCI may be optional, and may be implemented as an internal software interface.

A communication link 130 established between two Bluetooth devices (e.g., between a source device 110-*a* and a wireless audio device 115-*a*) may provide for communications or services (e.g., according to some Bluetooth profile). For example, a Bluetooth connection may be an extended synchronous connection orientated (eSCO) link for voice call (e.g., which may allow for retransmission), an ACL link for music streaming (e.g., A2DP), etc. For example, eSCO packets may be transmitted in predetermined time slots (e.g., 6 Bluetooth slots each for eSCO). The regular interval between the eSCO packets may be specified when the Bluetooth link is established. The eSCO packets to/from a specific slave device (e.g., wireless audio device 115-*a*) are acknowledged, and may be retransmitted if not acknowledged during a retransmission window. In addition, audio may be streamed between the source device 110-*a* and wireless audio device 115-*a* using an ACL link (A2DP profile). In some cases, the ACL link may occupy 1, 3, or 5 Bluetooth slots for data or voice. Other Bluetooth profiles supported by Bluetooth devices may include Bluetooth Low Energy (BLE) (e.g., providing considerably reduced power consumption and cost while maintaining a similar communication range), human interface device profile (HID) (e.g., providing low latency links with low power requirements), etc.

In some cases, a device may be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some cases, Bluetooth and WLAN communications may share a same medium, such as the same unlicensed frequency medium. In such cases, a source device 110 may support WLAN communications via AP 105, which may include communicating over communication links 130 (e.g., WLAN communication links). The AP 105 and the associated source devices 110 may represent a basic service set (BSS) or an extended service set (ESS). The various source devices 110 in the network may be able to communicate with one another through the AP 105. In some cases, the AP 105 may be associated with a coverage area, which may represent a basic service area (BSA).

Source devices 110 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within wireless communication system 100, and devices may communicate with each other via communication links 130 (e.g., peer-to-peer communication links). AP 105 may be coupled to a network, such as the Internet, and may enable a source device 110 to communicate via the network (or communicate with other source devices 110 coupled to the AP 105). A source device 110 may communicate with a network device bi-directionally. For example, in a WLAN, a source device 110 may communicate with an associated AP 105 via downlink (e.g., the communication link from the AP 105 to the host device110) and uplink (e.g., the communication link from the source device 110 to the AP 105).

In some examples, content, media, audio, etc. exchanged between a source device 110 and a wireless audio device 115 may originate from a WLAN. For example, in some cases, source device 110-*a* may receive audio from an AP 105 (e.g., via WLAN communications), and the source device 110-*a* may then implement the described techniques to relay or pass the audio to the wireless audio device 115-*a* (e.g., via Bluetooth communications). In some cases, certain types of Bluetooth communications (e.g., such as high quality or high definition (HD) Bluetooth) may require enhanced quality of service. For example, in some cases, delay-sensitive Bluetooth traffic may have higher priority than WLAN traffic.

Figure 2A:
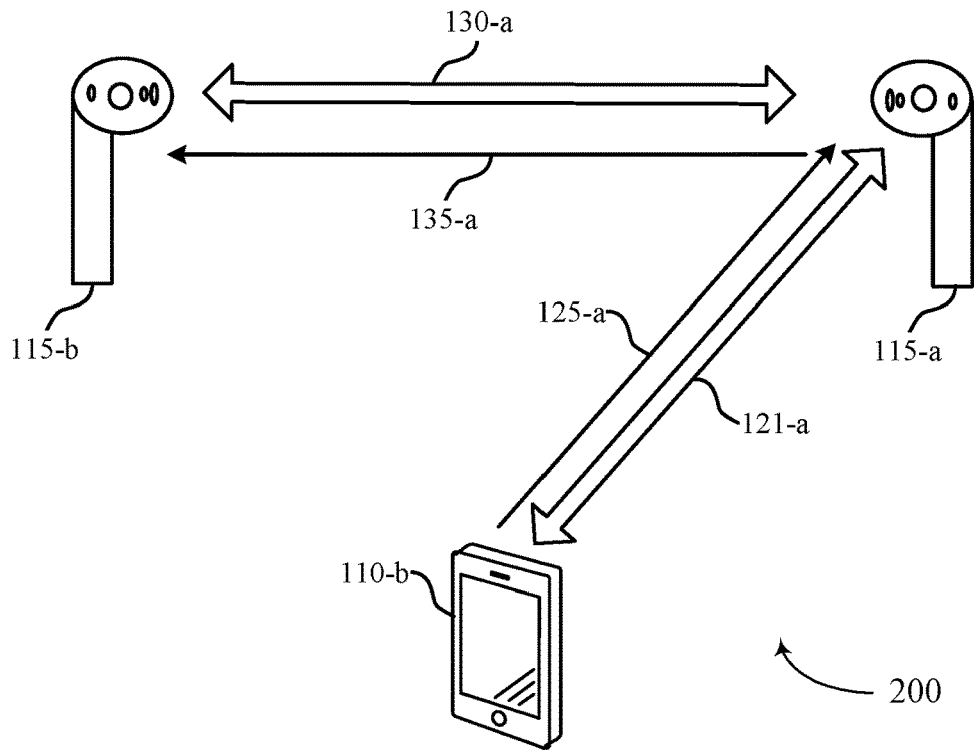
FIG. 2A illustrates an example of a wireless communications system that supports seamless link transfers between primary and secondary devices in accordance with aspects of the present disclosure.
Figure 2B:
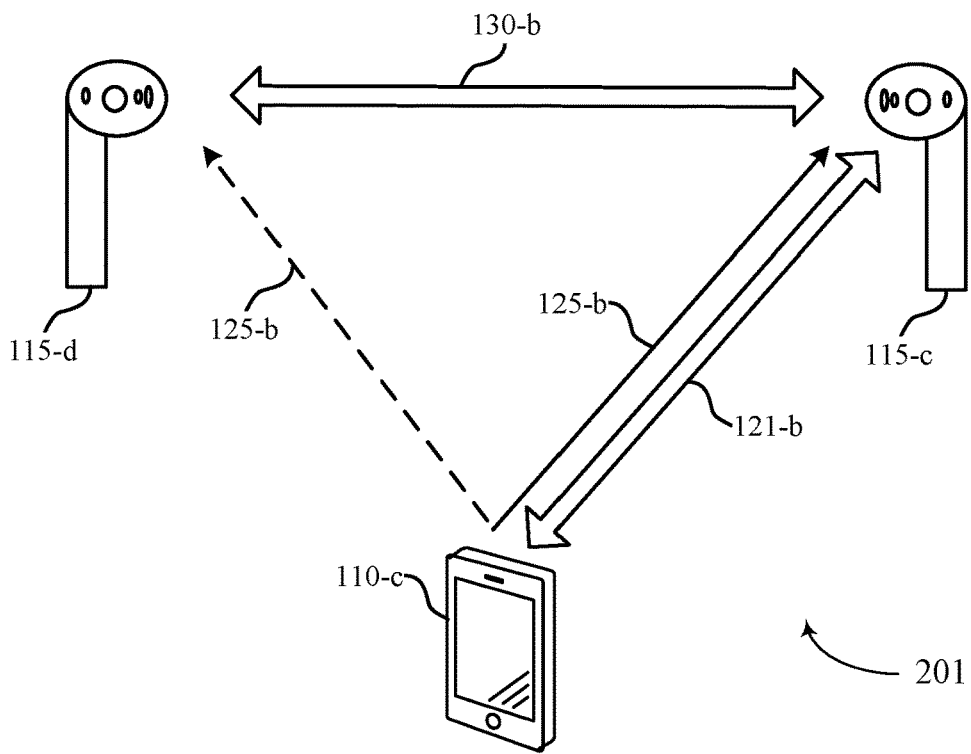
FIG. 2B illustrates an example of a wireless communications system that supports seamless link transfers between primary and secondary devices in accordance with aspects of the present disclosure.

In some examples, as described in greater detail with respect to FIGS. 2A and 2B, a source device 110-*a* may be referred to as a source device 110-*a*, and a wireless audio device 115-*a* may be referred to as a primary wireless audio device or a secondary wireless audio device. That is, a primary wireless audio device 115-*a* may be in direct communication with a source device 110-*a*, and a secondary wireless audio device 115-*a* may sniff communications between source device 110-*a* and primary wireless audio device 115-*a*.

In some examples, a first wireless audio device 115 (e.g., a wireless audio device acting in the role of a primary wireless audio device) may initiate a role switch procedure without sending any indication of the device role switch to a source device 110-*a* (e.g., a cell phone). The first wireless audio device 115 may disable traffic flow between the source device and the first wireless audio device. Upon disabling traffic, the first wireless audio device 115 may transmit synchronization information and timing information necessary for taking over the role of primary wireless audio device. When all relevant information has been transmitted to the second wireless audio device 115, the first wireless audio device 115 may transmit a device role switch message indicating a device role switch between the first wireless audio device 115 and the second wireless audio device 115. After the first wireless audio device 115 transmits the device role switch message, the first wireless audio device 115 and the second wireless audio device 115 may perform the role switch. After performing the role switch, the first wireless audio device 115 may assume the role of a secondary wireless audio device 115 and the second wireless audio device 115 may assume the role of a primary wireless audio device.

In some examples, a first wireless audio device 115 (e.g., a wireless audio device acting in the role of a primary wireless audio device) may initiate a role switch procedure without sending any indication of the device role switch to a source device 110 (e.g., a cell phone). The first wireless audio device 115 may disable traffic flow between the source device 110 and the first wireless audio device 115. Upon disabling traffic, the first wireless audio device 115 may transmit synchronization information and timing information necessary for taking over the role of primary wireless audio device. When all relevant information has been transmitted to the second wireless audio device 115 may transmit a device role switch message indicating a device role switch between the first wireless audio device 115 and the second wireless audio device 115. After the first wireless audio device 115 may transmit the device role switch message, the first wireless audio device 115 and the second wireless audio device 115 may perform the role switch. After performing the role switch, the first wireless audio device 115 may assume the role of a secondary wireless audio device and the second wireless audio device 115 may assume the role of a primary wireless audio device.

A wireless audio device may disable a traffic flow between a source device and the first wireless audio device, transmit, based at least in part on disabling the traffic flow, synchronization information and timing information to a second wireless audio device, transmit, based at least in part on transmitting the synchronization information and the timing information, a device role switch message indicating a device role switch between the first wireless audio device and the second wireless audio device, perform, based at least in part on the device role switch message, the role switch, and sniffing, based at least in part on the role switch, air traffic from the source device to the second wireless audio device. Advantages of disabling traffic flow, transmitting synchronization and timing information, transmitting a device role switch message, performing the role switch and sniffing air traffic may include no disconnection from the source device, the source device may not be aware the connection handover between the wireless audio devices is occurring, the source device may not require a special application, the source device may connect to a single Bluetooth address, and there is no pause in A2DP streaming traffic, thus audio remains uninterrupted during the connection handover procedure.

A wireless audio device may disable traffic flow by identifying a gap period during which no communication is expected from the source device and disabling the traffic flow during the gap period. Advantages of identifying a gap period and disabling the traffic flow during the gap period may include avoiding glitching at the source device by utilizing the gap without any disconnection from the source device, such that the source device may not be aware the connection handover between the wireless audio devices is occurring. Thus, audio remains uninterrupted during the connection handover procedure.

A wireless audio device may perform a role switch. This role switch may include assuming a Bluetooth device address previously corresponding to the second wireless audio device, releasing a Bluetooth device address previously associated with the first wireless audio device, assuming a Bluetooth slave role previously held by the second wireless audio device, releasing a Bluetooth master device role previously held by the first wireless audio device, and releasing an asynchronous connection-less (ACL) connection with the source device and an extended synchronous connection oriented (eSCO) connection with the source device. Advantages of wireless audio devices assuming and releasing Bluetooth device addresses, switching slave and master roles, and releasing ACL connections may include improved user experience resulting from an absence of disconnection from the source device. The source device may be agnostic of the connection handover between the wireless audio devices, resulting in reduced complexity at the source device. For example, the source device may not require a special application to interact with the wireless audio devices. The source device may connect to a single Bluetooth address rather than separate Bluetooth addresses for each wireless audio device. In addition, the handover can occur without a pause in A2DP streaming traffic, meaning that audio remains uninterrupted during the connection handover procedure.

FIG. 2A illustrates an example of a wireless communications system 200 that supports seamless link transfers between primary and secondary devices in accordance with aspects of the present disclosure. In some examples, wireless communications system 200 may implement aspects of wireless communication system 100. Wireless communications system 200 illustrates an example of a wireless communications system 200 with a first topology may include a wireless device such as a source device 110-*b*. Source device 110-*b* may be, for example, a smart phone, a portable music playing device, or the like. Source device 110-*b* may be in communication via bidirectional primary communication link 121-*a* with one or more wireless audio devices, such as first wireless audio device 115-*a* or second wireless audio device 115-*b*. Bidirectional primary communication link 121-*a* may include, for example, control information. In some examples, source device 110-*b* may transmit voice data to first wireless audio device 115-*a*. Source device 110-*b* may transmit voice data 125-*a* over a separate voice link. In some examples, source device 110-*b* may perform the role of a master device and first wireless audio device 115-*a* may perform the role of a slave device to source device 110-*b*.

In some examples, first wireless audio device 115-*a* may establish a communication link 130-*a* (e.g., a control link) with second wireless audio device 115-*b*. First wireless audio device 115-*a* may perform the role of a master device, and second wireless audio device 115-*b* may perform the role of a slave device to first wireless audio device 115-*a*. First wireless audio device 115-*a* may also transmit voice data 135-*a* to second wireless audio device 115-*b* on a separate voice link. In some cases, the first wireless audio device 115-*a* may have the responsibility to relay left/right (L/R) channel or music to the second wireless audio device 115-*b*.

FIG. 2B illustrates an example of a wireless communications system 201 that supports seamless link transfers between primary and secondary devices in accordance with aspects of the present disclosure. In some examples, wireless communications system 201 may implement aspects of wireless communication system 100. In some examples, as shown in FIG. 2B, a wireless communications system 201 with a second topology may include a source device 110-*c*, a first wireless audio device 115-*c*, and a second wireless audio device 115-*d*. In some examples, source device 110-*c* may communicate with first wireless audio device 115-*c* via a bidirectional primary communication link 121-*b*. Source device 110-*c* may transmit voice data 125-*b* to first wireless audio device 115-*c*. In some examples, first wireless audio device 115-*c* may establish a communication link 130-*b* (e.g., a control link) with second wireless audio device 115-*d*. First wireless audio device 115-*c* and second wireless audio device 115-*d* may communicate (e.g., perform synchronization procedures) via communication link 130-*b*. In some examples, source device 110-*c* may perform the role of a master device and first wireless audio device 115-*c* may perform the role of a slave device to source device 110-*c*.

In some examples, first wireless audio device 115-*c* may provide second wireless audio device 115-*d* with information, or may perform connection or synchronization procedures via communication link 130-*b*. First wireless audio device 115-*c* may perform the role of a master device, and second wireless audio device 115-*d* may perform the role of a slave device to first wireless audio device 115-*c*. Second wireless audio device 115-*d* may perform Bluetooth sniffing procedures based on the information received via communication link 130-*b*, and may receive audio data (e.g., voice data 125-*b*) that is sent from source device 110-*c* to first wireless audio device 115-*c*.

In the first topology of FIG. 2A or the second topology of FIG. 2B, because the first wireless audio device 115 is actually connected to the source device 110, user experience may be degraded under certain circumstances that lead to disconnection of the bidirectional primary communication link 121 between the source device 110 and the first wireless audio device 115, and a reestablishment of the bidirectional primary communication link 121 with the second wireless audio device 115. For instance, a user may walk away with a secondary earbud (e.g., second wireless audio device 115) plugged in their ear and a phone (e.g., source device 110) in the user's pocket, leaving a primary earbud (e.g., first wireless audio device 115) behind (e.g., on a table or in an earbud case). In such examples, the primary earbud may link with the phone and the secondary earbud may become disconnected when out of range. In another example, a device role switch may be performed due to power balancing. For instance, the primary earbud may be draining power faster than the secondary earbud in some use cases (e.g., A2DP streaming). In such examples, power balancing may lead to disconnection of the link between the primary earbud and the phone, and perming a device role switch procedure. In some examples, link quality may trigger a device role switch performance. For example, an earbud with less interference may perform better as a primary earbud than an earbud with more interference. Thus, if a primary earbud is experiencing more interference than a secondary earbud, then the link quality difference may trigger a device role switch procedure. These, or other triggers, may occur during audio streaming from the phone.

A device role switch procedure may result in decreased user experience if the procedure includes a disconnection and reconnection to a source device 110. In some examples, as described above, one or more scenarios may trigger a device role switch procedure. However, if the device role switch procedure includes disconnecting from the phone, the user may experience an audio glitch or an audio cause (e.g., during audio streaming, video streaming, or the like).

To avoid the audio glitching or pausing, the first wireless audio device 115 may transfer the Bluetooth connection (e.g., a handover procedure or a device role switch) with the source device 110 to a second wireless audio device 115 without a disconnection process with the Phone. That is, both a first wireless audio device 115 (e.g., a primary wireless audio device) and a second wireless audio device 115 (e.g., a secondary wireless audio device) may refrain from sending an A2DP pause/resume message to the source device. This may result in glitch free operation of earbuds even where a use case results in a device role switch. For instance, a brief pause of flow stop of L2CAP transmissions from the baseband may occur, but the pause may be within A2DP latency limits, as described in greater detail with respect to FIG. 2 and FIG. 3. In some examples, a first wireless audio device 115 (e.g., acting in the role of a primary wireless audio device) may utilize a time when the source device 110 is not communicating (e.g., during a coexistence window) to pass Bluetooth connection related information (e.g., timing information, synchronization information, control state information, or the like) to the second wireless audio device 115, and may carry out a role swap of primary and secondary roles with the second wireless audio device. This may allow the wireless audio devices 115 to perform a device role swap without exceeding any latency requirements and without the user experiencing any audio glitches.

Figure 3:
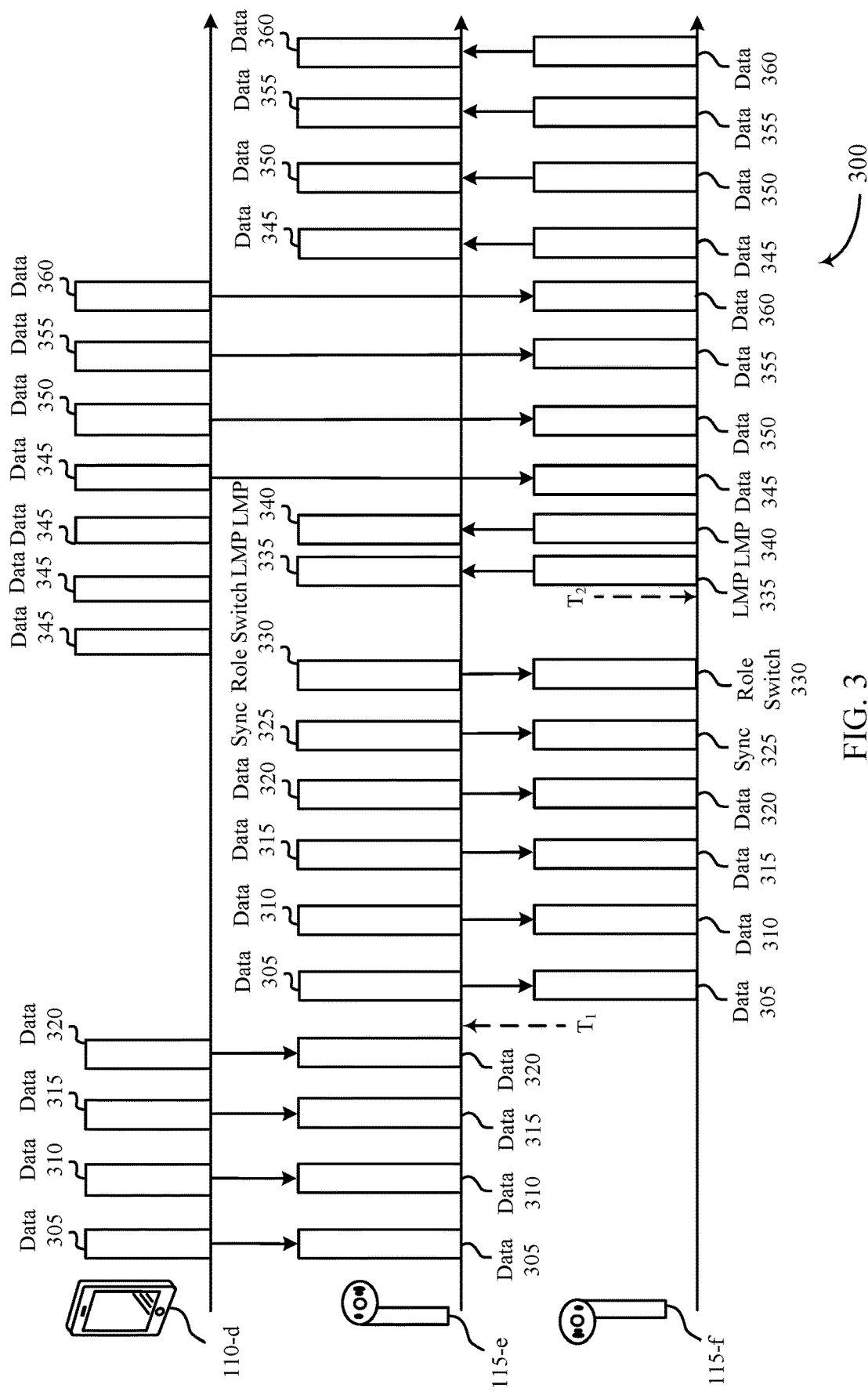
FIG. 3 illustrates an example of a timeline that supports seamless link transfers between primary and secondary devices in accordance with aspects of the present disclosure.

FIG. 3 illustrates an example of a timeline 300 that supports seamless link transfers between primary and secondary devices in accordance with aspects of the present disclosure. In some examples, timeline 300 may implement aspects of wireless communication system 100, wireless communications system 200, or wireless communications system 201.

In some examples, a host application running on a first wireless audio device 115-e acting in the role of the primary wireless audio device may determine (e.g., based on a trigger such as power balancing, interference earbud separation, link quality, or the like) to transfer ownership of a Bluetooth link with the source device 110-d to the second wireless audio device 115-f (e.g., acting in the role of a secondary wireless audio device). Instead of disconnecting the link to the source device 110-d, the first wireless audio device 115-d may freeze communication with the source device 110-d (e.g., inhibit transmission, reception, or both). The first wireless audio device 115-d may refrain from transmitting a message (e.g., an A2DP pause message) to the source device 110-d while performing a device role switch procedure.

In some examples, as described in greater detail with respect to FIG. 2A and FIG. 2B, a source device 110-d may be in communication with a first wireless audio device 115-e. Source device 110-d may send data 305 to first wireless audio device 115-e acting in the role of a primary wireless audio device. In some examples, first wireless audio device 115-e may relay data 305 to second wireless audio device 115-f (e.g., as described with respect to FIG. 2A). Although not illustrated with respect to FIG. 3, in some examples, second wireless audio device 115-f (e.g., acting in the role of a secondary wireless audio device) may sniff the link between source device 110-d and first wireless audio device 115-e to receive data 305 (e.g., as described with respect to FIG. 2b). Although FIG. 3 illustrates and describes a device role switch procedure in a relay topology as described with respect to FIG. 2A, the same or similar procedures may be implemented in the sniffing topology of FIG. 2A. In some examples, (e.g., in a relay topology as described with respect to FIG. 2A) source device 110-d may transmit one or more data packets together or separately (e.g., may transmit data 305, data 310, data 315, and data 320) to first wireless audio device 115-e. In some examples, first wireless audio device 115-e may send an acknowledgement (ACK) message to source device 110-d indicating that it has successfully received data 305. In some examples, first wireless audio device 115-e may relay data 305, data 310, data 315, and data 320 to second wireless audio device 115-f after receiving the respective data packets from source device 110-d. In some examples, first wireless audio device 115-e may relay the data packets during a gap period or time period during which source device 110-d is not communicating with first wireless audio device 115-e.

First wireless audio device 115-e may initiate a device role switch by disabling communication with the source device 110-d. For instance, upon determining a trigger (e.g., power imbalance, link quality, distance between devices, or the like) first wireless audio device 115-e may disable communications with source device 110-d. In some examples, first wireless audio device 115-d may disable the communications at a point when source device 110-d goes away from the piconet of first wireless audio device 115-e (e.g., to serve Wi-Fi Coexistence protocol, or the like). In some examples, such a gap may occur between transmitting data 320 and beginning to transmit data 345. This gap may, for example, have a duration of less than 100 ms (e.g., 70 ms, 80 ms, etc.).

At $T_1$, (e.g., after determining a role swap trigger) first wireless audio device 115-e may disable communications with source device 110-d. In some examples, disabling the communication may include ignoring all subsequent transmissions from source device 110-d. In some examples, disabling the communications may include disabling reception capabilities, transmission capabilities, or both. In some examples, disabling the communications may include freezing all L2CAP communications, but maintaining baseband communications. In some examples, disabling the communications may include refraining from sending ACK messages or sending NACK messages for all received communications from the source device 110-d until communications are reenabled after a device role switch procedure is complete. In some examples, first wireless audio device 115-e may identify a subsequent or concurrent gap in communications from source device 110-d, and may disable the communications at that time (e.g., $T_1$). The gap in communication may occur after each packet, after each set of packets (e.g., data 305, data 310, data 315, and data 320) or may occur periodically when source device 110-d performs communication with other devices via another wireless communications protocol (e.g., during a Wi-Fi coexistence window). Freezing communication during the identified gap may ensure that latency introduced due to a role swap procedure is decreased, or satisfies a threshold amount of time. That is, by utilizing the time during which the source device 110-d is not communicating with first wireless audio device 115-e, any additional latency from performing a device role swap may still fall within an allowable latency that does not cause any glitching for the user (e.g., 100 ms or less).

In some examples, after disabling communication with source device 110-d at $T_1$, first wireless audio device 115-e may provide relevant information for a primary wireless audio device role to second wireless audio device 115-f. In some examples, first wireless audio device 115-e may relay received data 305, data 310, data 315, and data 320 to second wireless audio device 115-f. The relay may occur in a relay topology as described in FIG. 2A. First wireless audio device 115-e may relay any pending packets (e.g., A2DP data) received from source device 110-d which second wireless audio device 115-f has not yet received or has not yet sniffed. The relay may occur over a dedicated link with second wireless audio device 115-f. In some examples, first wireless audio device 115-e may provide synchronization information 325 to second wireless audio device 115-f. Additionally, or alternatively, first wireless audio device 115-e may also provide control information, Bluetooth controller or Bluetooth host information, along with synchronization information and timing information regarding the piconet for source device 110-d. Based on this information, second wireless audio device 115-f may rebuild its stack and acquire timing information for assuming the role of a primary wireless audio device. However, while preparing to assume the role of primary wireless audio device, second wireless audio device 115-f may still perform the role of secondary wireless audio device.

When all relevant information for assuming the role of primary wireless audio device is provided to second wireless audio device 115-f, first wireless audio device 115-e may transmit a device role switch message 330. The device role switch message 330 may indicate that first wireless audio device 115-e is prepared and has provided all relevant information for performing a device role switch. Upon receive the device role switch message 330, second wireless audio device 115-f may determine that it is ready to perform the device role switch. In some examples, a handshake procedure may be performed. For instance, second wireless audio device 115-f may send a response message, an ACK message, or the like, to first wireless audio device 115-*e*, indicating that it has received the device role switch message 330, or indicating that it is prepared to perform the device role switch.

Upon receiving the device role switch message 330, second wireless audio device 115-*f* and first wireless audio device 115-*e* may perform the device role switch (e.g., at $T_2$). First wireless audio device 115-*e* may abandon the role of primary wireless audio device and may assume the role of secondary wireless audio device. This may include assuming the Bluetooth address (e.g., BL ADDR) previously associated with second wireless audio device 115-*f*, and abandoning the role of master Bluetooth device and assuming the role of slave Bluetooth device. Performing the device role switch may further include abandoning control of an eSCO link and an ADR link with source device 110-*d*. Second wireless audio device 115-*f* may abandon the role of secondary wireless audio device and may assume the role of primary wireless audio device. This may include assuming the Bluetooth address previously associated with first wireless audio device 115-*e* and abandoning the role of slave Bluetooth device and assuming the role of master Bluetooth device. Performing the device role switch may further including assuming control of the eSCO link and the ADR link with source device 110-*d*. The device role switch may be performed simultaneously, or the various aspects of the device role switch may be performed separately. For instance, a first message may indicate a Bluetooth address change, a second message may indicate Bluetooth device role change, and a third message may indicate a link transfer, and second wireless audio device 115-*f* may separately perform an indicated task upon receiving each respective message. Or, the device role switch message 330 may include separate indications for multiple tasks, and second wireless audio device 115-5*f* may perform each task, one after the other. Alternatively, second wireless audio device 115-*f* may receive device role switch message 330 and may immediately or simultaneously perform the address switch, the role switch, and takeover the links based on the device role switch message 330.

Second wireless audio device 115-*f* may, upon performing the device role switch, resume traffic with source device 110-*d*. For example, source device 110-*d* may send data 345 a first time prior to $T_2$. Because first wireless audio device 115-*e* (still acting in the role of primary wireless audio device) has disabled communications, first wireless audio device 115-*e* may refrain from communicating with source device 110-*d*. This may include sending a NACK message for data 345, ignoring data 345, or the like. Source device 110-*d* may receive a NACK message, or may fail to receive an ACK message, and may therefore send a first retransmission of data 345. At $T_2$, second wireless audio device 115-*f* may assume the role of primary wireless audio device. Second wireless audio device 115-*f* may thus provide information to first wireless audio device 115-*e* for acting in the new role of secondary wireless audio device. For instance, second wireless audio device 115-*f* may send link manager protocol (LMP) packet 335 and LMP packet 340 to first wireless audio device 115-*e*. Because second wireless audio device 115-*f* is transmitting LMP packets to first wireless audio device 115-*e*, second wireless audio device 115-*f* may fail to receive the first retransmission of data 345 and second retransmission of data 345. Having failed to receive an ACK message in response to a third retransmission of data 345, source device 110-*d* may send a third retransmission of data 345. Having performed the device role switch at $T_2$, and having provided LMP packets to first wireless audio device 115-*e*, second wireless audio device 115-*f* may enable communications with source device 110-*d*, and may receive the third retransmission of data 345. In some examples, second wireless audio device 115-*f* may send an ACK message to source device 110-*d*. Source device 110-*d* may subsequently transmit data 350, data 355, and data 360. In some examples, (e.g., a relay topology), second wireless audio device 115-*f* may relay the received data 345, data 350, data 355, and data 360 to first wireless audio device 115-*f*. Alternatively (e.g., a sniffing topology), first wireless audio device 115-*e* may sniff data 345, data 350, data 355, and data 360 when source device 110-*d* transmits them to second wireless audio device 115-*f*.

The device role switch procedure described herein may satisfy latency requirements for wireless communication between the source device 110-*d* and a primary wireless audio device. For example, a device role switch procedure may not result in glitching or pausing at the source device 110-*d* if it takes less than a particular duration (e.g., 100 ms). In some examples, a time period for relaying received data packets to second wireless audio device 115-*f* or to provide data packets and synchronization, control state, and timing information, may have a first duration (e.g., about 25 ms). A time period for rebuilding the stack, preparing to assume the role of primary role device, and provide LMP data packets to the first wireless audio device and resume communications with source device 110-*d* (e.g., receive a retransmission of data 345) may have a second duration (e.g., about 30 ms). Thus, the first duration (e.g., about 25 ms) and the second duration (e.g., about 30 ms) may satisfy a threshold amount of time (e.g., about 100 ms) such that no audio glitching occurs during the device role switch procedure.

In some examples, (e.g., a sniffing topology as described with respect to FIG. 2A) first wireless audio device 115-*e* may not have to relay data 305, data 310, data 315, and data 320 to second wireless audio device 115-*f*, and synchronization information 325 may be transmitted earlier, resulting in a device role switch that is even faster.

The techniques described herein may be beneficial because the device role switch may occur without a disconnection to source device 110-*d*. Source device 110-*d* may not provide any pop-up message or other indication to the user regarding a disconnection from first wireless audio device 115-*e* and a connection to second wireless audio device 115-*f*. In fact, source device 110-*d* may not be aware of the device role switch occurring. No special application may be necessary at source device 110-*d*. From the point of view of source device 110-*d*, source device 110-*d* only communicates with a single Bluetooth device address (e.g., because the devices switch Bluetooth device addresses upon performing the device role switch). The device role switch described herein may result in no pause or glitch in streaming (e.g., A2DP Streaming traffic) at source device 110-*d*, such that audio may remain un-interrupted for a user during the connection handover procedure.

Figure 4:
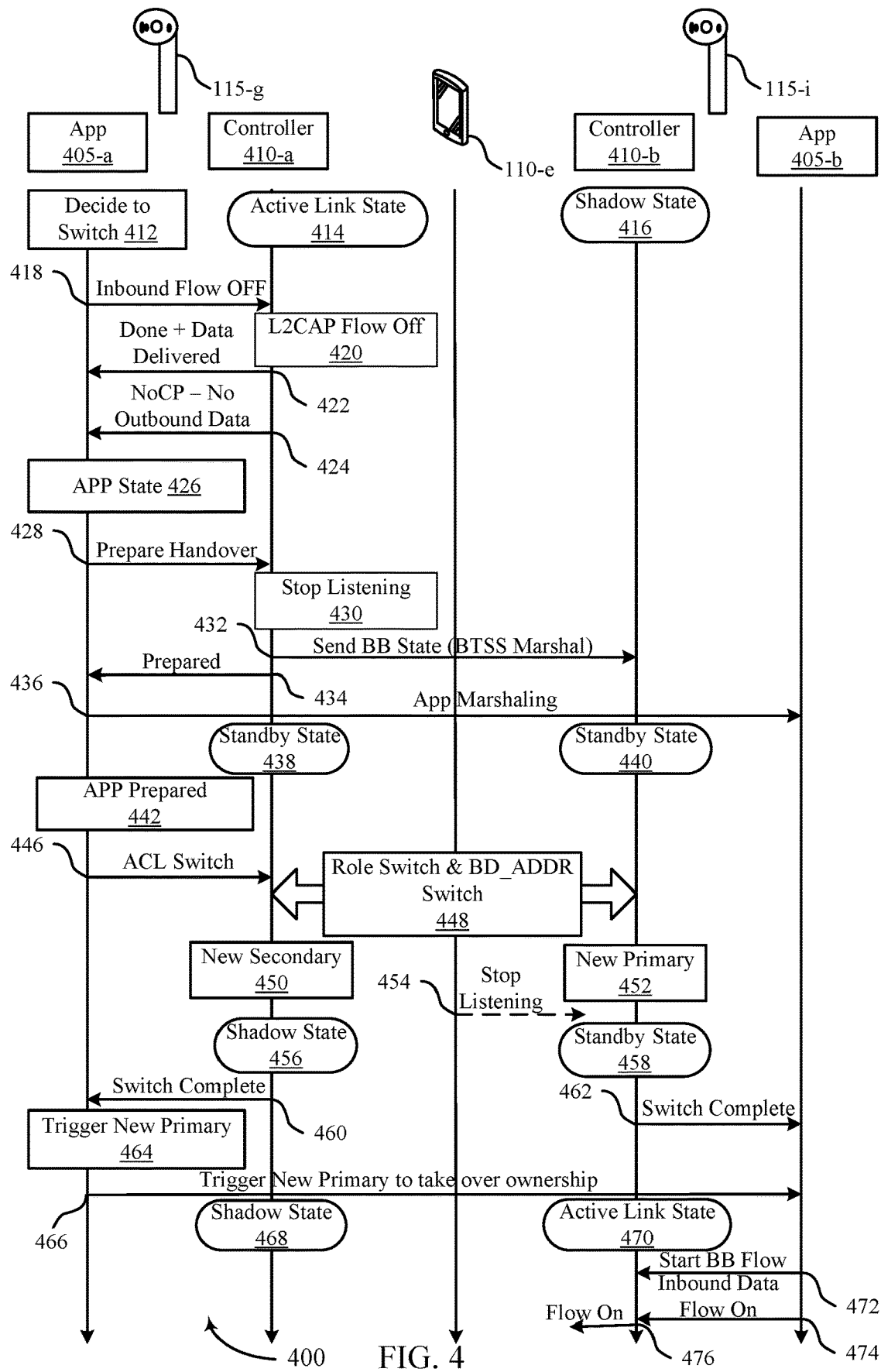
FIG. 4 illustrates an example of a process flow that supports seamless link transfers between primary and secondary devices in accordance with aspects of the present disclosure.

FIG. 4 illustrates an example of a process flow 400 that supports seamless link transfers between primary and secondary devices in accordance with aspects of the present disclosure. In some examples, process flow 400 may implement aspects of wireless communication system 100, wireless communications system 200, or wireless communications system 201.

In some examples, source device 110-*e* may be in communication with a primary wireless audio device (e.g., first wireless audio device 115-*g*). A secondary wireless audio device (second wireless audio device 115-*i*) may sniff a link between first wireless audio device 115-*g* and source device 110-e, or first wireless audio device 115-g may relay received data to second wireless audio device 115-i. In some examples, first wireless audio device 115-g may include a host application 405-a and a controller 410-a which may be in communication with each other. Second first wireless audio device 115-i may include a host application 405-b and a controller 410-b which may be in communication with each other.

Initially, (e.g., prior to 412), first wireless audio device 115-g, acting as a primary wireless audio device, may provide synchronization information of the piconet of source device 110-e to second wireless audio device 115-i acting as a secondary wireless audio device. Second wireless audio device 115-i, acting as a secondary wireless audio device, may sniff or follow traffic (e.g., eSCO traffic and ACL traffic) from source device 110-e to first wireless audio device 115-g. First wireless audio device 115-g may continue to send updated synchronization information to second wireless audio device 115-i such that second wireless audio device 115-i may seamlessly follow traffic from source device 110-e.

At 412, the host application 405-a may determine to perform a role device switch. That is, host application 405-a or host stacks for first wireless audio device 115-g may determine to handover its connection with source device 110-e to second wireless audio device 115-i. The determination may be based on mutual communication with second wireless audio device 115-i. Thus, at 412, second wireless audio device 115-i may similarly determine to perform a handover procedure, based on the same mutual communication. Alternatively, second wireless audio device 115-i may determine to perform a handover upon receiving messaging from first wireless audio device 115-g at 432.

At 414, controller 410-a of first wireless audio device 115-g may operate in an active link state. At 416, controller 410-b of second wireless audio device 115-i may operate in a shadow state.

At 418, host application 405-a may send an inbound flow off indication to controller 410-a. That is, host application 405-a may instruct controller 410-a to stop incoming L2CAP traffic by setting inbound data to an off setting. Or, host application 405-a may stop communicating with source device 110-e (e.g., during a window during which source device 110-e is not sending any communication to first wireless audio device 115-g). At 420, controller 410-a may turn an L2CAP data flow off based on the inbound flow off indication received at 418.

At 422, controller 410-a may relay any pending data to app 405-a and may complete any data transmissions. At 424, controller 410-a may send a number of completed packets (NoCP) message, a no outbound data message, or the like.

At 426, host application 405-a may determine whether an application is in a well-defined state. For example, after incoming L2CAP data is stopped, host application 405-a may re-asses a current situation based on last packets received from source device 110-e. If the Bluetooth stack or host application 405-a is not in a well-defined state, first wireless audio device 115-g may resume incoming and outgoing ACL traffic with source device 110-e. After an amount of time has passed, first wireless audio device 115-g may attempt to initiate another handover procedure (e.g., may reinitiate the procedure at 412).

At 428, host application 405-a may indicate to controller 410-a to prepare for a handover procedure. At 430, in response to the indication received at 428, controller 410-a of first wireless audio device 115-b may stop listening for communications from source device 110-e (e.g., may freeze traffic with source device 110-e). This may include freezing incoming or outgoing packets, LMP packets, etc.

At 432, controller 410-a of first wireless audio device 115-g may send baseband state information to controller 410-b. That is, controller 410-a may perform base transceiver synchronization signal (BTSS) marshaling (e.g., may marshal Bluetooth controller state information to controller 410-b) without sending an A2DP pause message to second wireless audio device 115-i. Instead, controller 410-a may send Bluetooth upper layer information, profile related information, data structures, and the like to controller 410-b.

At 434, controller 410-a may send an indication to host application 405-a that wireless audio device 115-g is prepared for a handover procedure.

At 436, the host application 405-a of first wireless audio device 115-g may send application marshalling information to the host application 405-b of second wireless audio device 115-i. That is, host application 405-a may send Bluetooth upper layer information, profile related information, data structures, and the like to host application 405-b.

At 438, having sent the application marshalling information at 436, controller 410-a of first wireless audio device 115-g may enter a standby state, where first wireless audio device 115-g may have everything in place to enter an active state or to perform a device role switch.

At 440, having received the application marshalling information at 436, controller 410-b of second wireless audio device 115-i may enter a standby state, where second wireless audio device 115-i may have everything in place to enter an active state or to perform the device role switch.

At 442, host application 405-a of first wireless audio device 115-g may determine that host application 405-a is prepared to perform a device role switch.

At one or more times after controller 410-a stops listening to source device 110-e, source device 110-e may send one or more messages to first wireless audio device 115-g. For example, source device 110-g may send a message after 432, or may send a number of messages (e.g., four messages, or a first messages and multiple retransmissions of the first message) after 436. However, because first wireless audio device 115-g stopped listening at 430, first wireless audio device 115-g may not receive the messages, or may refrain from sending an ACK message in response to the messages, may send a NACK message in response to the received messages, or may have disabled receiving capabilities and may not note the messages.

At 446, host application 405-a may send an ACL switch indication to controller 410-a, initiating a device role switch.

At 448, controller 410-a of first wireless audio device 115-g and controller 410-b of second wireless audio device 115-i may communicate with each other, and perform a device role switch. The device role switch may include one or more of, a primary secondary ownership transfer, a handover procedure, an ACL link swap, a role swap, and the like. Controller 410-a and controller 410-b may also switch Bluetooth device addresses at 448.

The device role switch may include multiple sub procedures. For example, the device role switch may include a Bluetooth address swap, a master/slave role switch between first wireless audio device 115-g and second wireless audio device 115-i, and a new secondary wireless audio device taking over an ACL connection and an eSCO connection with source device 110-e. The sub procedures may be clubbed in a single instant (e.g., upon performing a device role switch), or, multiple instants as communicated by first wireless audio device 115-g (e.g., using a proprietary scheme). For instance, first wireless audio device 115-g may send a single message including an indication of each of the sub procedures, and second wireless audio device 115-*i* may simultaneously execute each sub procedure. Or, first wireless audio device 115-*g* may send a separate message for each sub procedure, and second wireless audio device 115-*i* may perform a sub procedure upon receiving each of the messages. In some examples, second wireless audio device 115-*i* may send a response message upon receiving an indication or completing a sub procedure.

At 450, based on the communications at 448, first wireless audio device 115-*g* may assume the role of a secondary wireless audio device, becoming the new secondary wireless audio device. First wireless audio device 115-*g* may assume a slave role to the master new first wireless audio device.

At 452, based on the communications at 448, second wireless audio device 115-*i* may assume the role of a primary wireless audio device, becoming the new primary wireless audio device. Second wireless audio device 115-*i* may assume the role of a master wireless audio device to the slave wireless audio device of the new secondary wireless audio device. Second wireless audio device 115-*i* may also use the Bluetooth addressed exposed to the source device 110-*e* (e.g., the Bluetooth address previously used by first wireless audio device 115-*g*), and first wireless audio device 115-*g* may use the Bluetooth address not exposed to source device 110-*e* (e.g., the Bluetooth address previously used by second wireless audio device 115-*i*). The host application 405-*b* of the new primary wireless audio device may apply the controller state information received at 432 and/or 436.

Because wireless audio device 115-*i* has not yet enabled communications, even if source device 110-*e* sends one or more communications (e.g., after communications at 448) second wireless audio device 115-*i* may not receive or respond to the communications from source device 110-*e*.

At 456, controller 410-*a* of first wireless audio device 115-*g* may enter a shadow state, where first wireless audio device 115-*g* can shadow a communication link between second wireless audio device 115-*i* and source device 110-*g*. At 458, controller 410-*b* of second wireless audio device 115-*i* may enter a standby state, wherein second wireless audio device 115-*i* may enter a standby state where everything ready to enter an active state.

At 460, controller 410-*a* may indicate to host application 405-*a* that the switch is complete, and that first wireless audio device 115-*g* now fills the role of a secondary wireless audio device. At 462, controller 410-*b* may indicate to host application 405-*b* that the switch is complete, and that second wireless audio device 115-*i* now fills the role of a primary wireless audio device.

At 464, first wireless audio device 115-*g* may determine to trigger second wireless audio device 115-*i* to initiate communications in the role of primary wireless audio device. At 466, host application 405-*a* of first wireless audio device 115-*g* may send a trigger to host application 405-*b* of second wireless audio device. The trigger may trigger an ownership takeover at host application 405-*b* of second wireless audio device 115-*i*. At 468, first wireless audio device 115-*g* may continue in a shadow state.

At 470, second wireless audio device 115-*i* may enter an active link state. At 472, host application 405-*b* may send an indication to start baseband flow of inbound data to controller 410-*b*.

At 474, host application 405-*b* may send an indication to controller 410-*b* to turn traffic flow on. Host application 405-*b* may re-enable incoming and outgoing traffic (e.g., ACL-C and ACL-U) with source device 110-*e*. Host application 405-*b* may first de-assert the baseband flow with source device 110-*e*, and may de-assert L2CAP flow with source device 110-*e*.

At 476, controller 410-*b* may turn the traffic flow on with source device 110-*e*. Upon turning the traffic flow on, second wireless audio device 115-*i* may recommence receiving messages sent by source device 110-*e*. Second wireless audio device 115-*i*, acting as the new primary wireless audio device, may take ownership of the eSCO link and the ACL link with source device 110-*e*, including the message integrity check (MIC) role, and may begin sending ACK messages and NACK messages in response to received data packets from source device 110-*e* at a predefined instant in time. The timing for taking over the ACL link and the eSCO link may be negotiated among the devices separately. Thus, the entire procedure may be completed without halting eSCO traffic with the source device 110-*e*.

Figure 5:
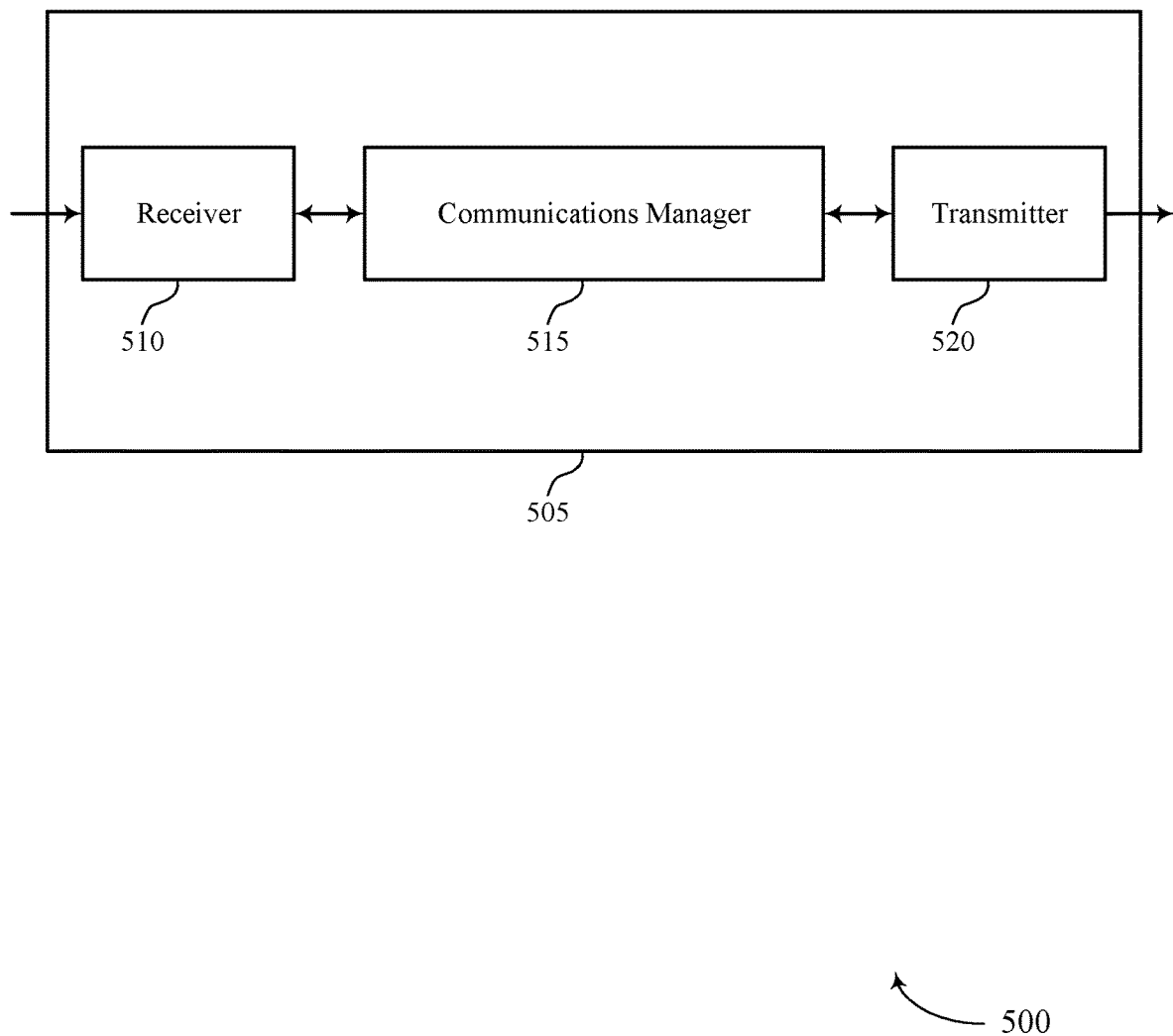
FIGS. 5 and 6 show block diagrams of devices that support seamless link transfers between primary and secondary devices in accordance with aspects of the present disclosure.

FIG. 5 shows a block diagram 500 of a device 505 that supports seamless link transfers between primary and secondary devices in accordance with aspects of the present disclosure. The device 505 may be an example of aspects of a device as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to seamless link transfers between primary and secondary devices, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may disable a traffic flow between a source device and the first wireless audio device, transmit, based on disabling the traffic flow, synchronization information and timing information to a second wireless audio device, transmit, based on transmitting the synchronization information and the timing information, a device role switch message indicating a device role switch between the first wireless audio device and the second wireless audio device, perform, based on the device role switch message, the role switch, and sniff, based on the role switch, air traffic from the source device to the second wireless audio device. The communications manager 515 may also sniff air traffic between a source device and the first wireless audio device, receive, from the first wireless audio device, synchronization information and timing information, receive, based on receiving the synchronization information and timing information, a device role switch message from the first wireless audio device, the device role switch message indicating a device role switch between the second wireless audio device and the first wireless audio device, perform, based on the device role switch message, the role switch, and enable a traffic flow between the source device and the second wireless audio device. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
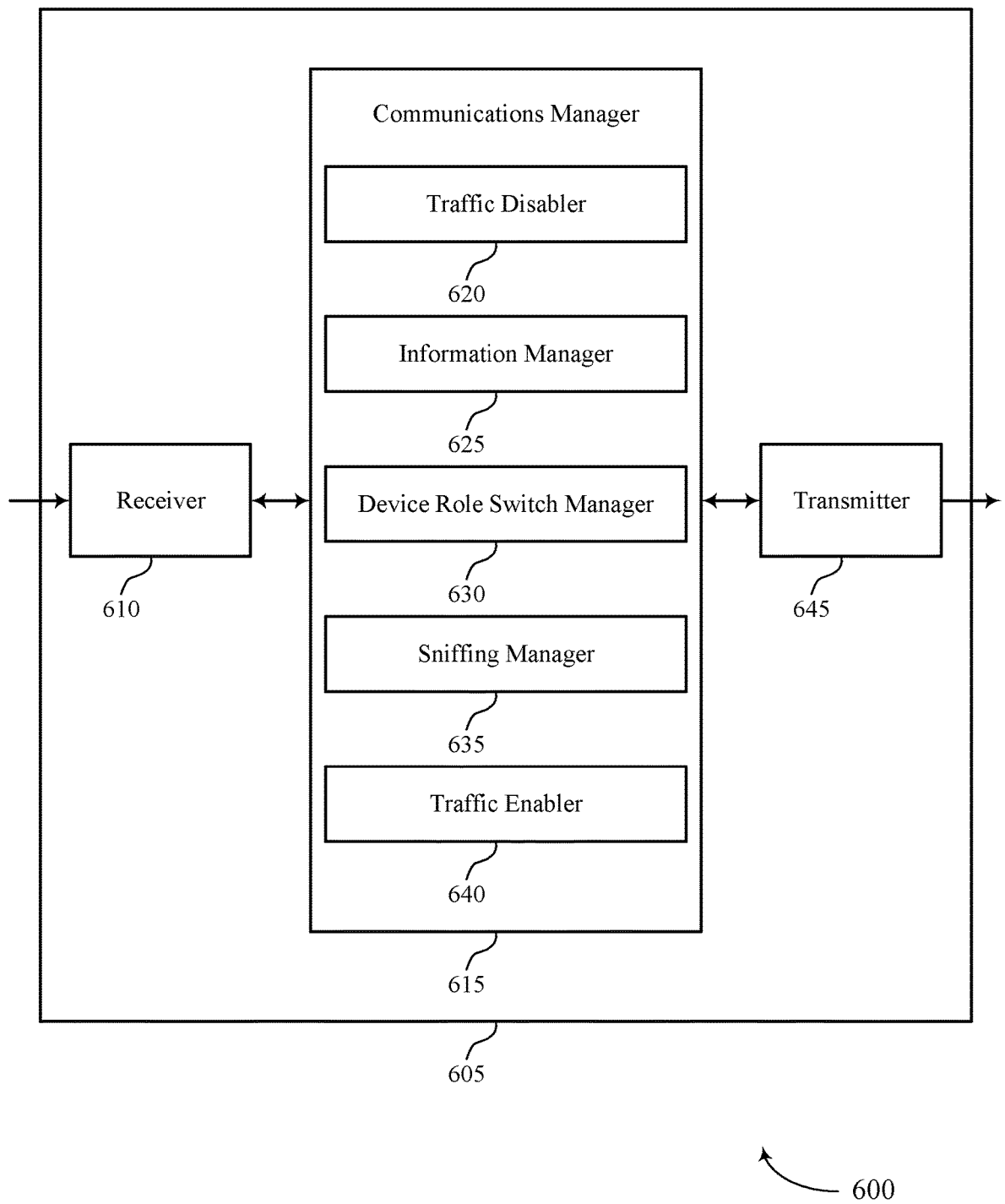

FIG. 6 shows a block diagram 600 of a device 605 that supports seamless link transfers between primary and secondary devices in accordance with aspects of the present disclosure. The device 605 may be an example of aspects of a device 505 or a wireless audio device 115 as described herein. The device 605 may include a receiver 610, a communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to seamless link transfers between primary and secondary devices, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a traffic disabler 620, an information manager 625, a device role switch manager 630, a sniffing manager 635, and a traffic enabler 640. The communications manager 615 may be an example of aspects of the communications manager 810 described herein.

The traffic disabler 620 may disable a traffic flow between a source device and the first wireless audio device.

The information manager 625 may transmit, based on disabling the traffic flow, synchronization information and timing information to a second wireless audio device.

The device role switch manager 630 may transmit, based on transmitting the synchronization information and the timing information, a device role switch message indicating a device role switch between the first wireless audio device and the second wireless audio device and perform, based on the device role switch message, the role switch.

The sniffing manager 635 may sniff, based on the role switch, air traffic from the source device to the second wireless audio device. The sniffing manager 635 may sniff air traffic between a source device and the first wireless audio device. The information manager 625 may receive, from the first wireless audio device, synchronization information and timing information.

The device role switch manager 630 may receive, based on receiving the synchronization information and timing information, a device role switch message from the first wireless audio device, the device role switch message indicating a device role switch between the second wireless audio device and the first wireless audio device and perform, based on the device role switch message, the role switch.

The traffic enabler 640 may enable a traffic flow between the source device and the second wireless audio device.

The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

Figure 7:
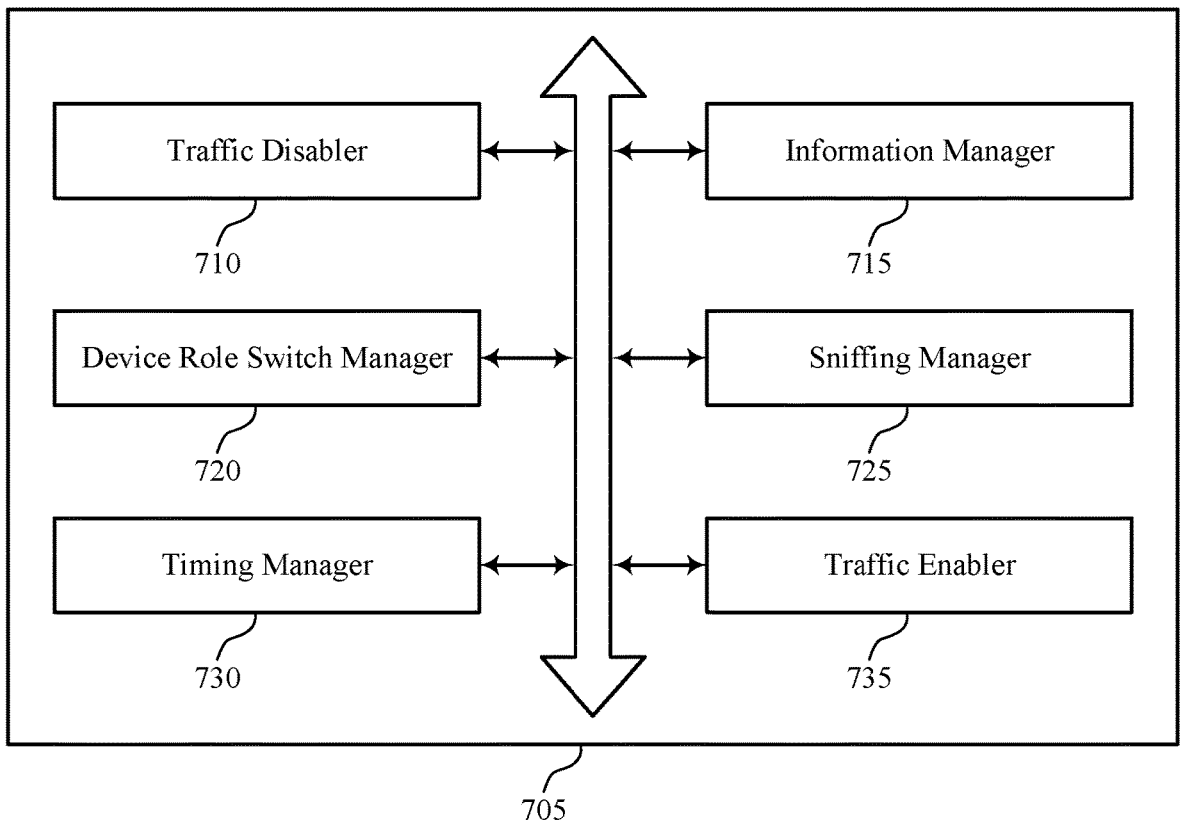
FIG. 7 shows a block diagram of a communications manager that supports seamless link transfers between primary and secondary devices in accordance with aspects of the present disclosure.

FIG. 7 shows a block diagram 700 of a communications manager 705 that supports seamless link transfers between primary and secondary devices in accordance with aspects of the present disclosure. The communications manager 705 may be an example of aspects of a communications manager 515, a communications manager 615, or a communications manager 810 described herein. The communications manager 705 may include a traffic disabler 710, an information manager 715, a device role switch manager 720, a sniffing manager 725, a timing manager 730, and a traffic enabler 735. Each of these modules may communicate, directly or indirectly, with one another (e.g., via one or more buses).

The traffic disabler 710 may disable a traffic flow between a source device and the first wireless audio device. In some examples, the traffic disabler 710 may disable the traffic flow during the gap period. In some examples, the traffic disabler 710 may receive one or more data packets from the source device. In some examples, the traffic disabler 710 may send one or more NACK messages to the source device in response to the one or more data packets. In some examples, the traffic disabler 710 may refrain from sending an ACK message to the source device in response to the one or more data packets.

The information manager 715 may transmit, based on disabling the traffic flow, synchronization information and timing information to a second wireless audio device. In some examples, the information manager 715 may receive, from the first wireless audio device, synchronization information and timing information.

In some examples, the information manager 715 may transmit the device role switch message based on the control state information.

In some examples, the information manager 715 may receive the device role switch message based on the control state information.

In some cases, the control state information includes Bluetooth upper layer information, data structure information, or a combination thereof. In some cases, the control state information includes Bluetooth upper layer information, data structure information, or a combination thereof.

The device role switch manager 720 may transmit, based on transmitting the synchronization information and the timing information, a device role switch message indicating a device role switch between the first wireless audio device and the second wireless audio device. In some examples, the device role switch manager 720 may perform, based on the device role switch message, the role switch.

In some examples, the device role switch manager 720 may receive, based on receiving the synchronization information and timing information, a device role switch message from the first wireless audio device, the device role switch message indicating a device role switch between the second wireless audio device and the first wireless audio device. In some examples, the device role switch manager 720 may perform, based on the device role switch message, the role switch.

In some examples, the device role switch manager 720 may identify a role switch trigger, where disabling traffic flow is based on identifying the role switch trigger. In some examples, the device role switch manager 720 may assume a Bluetooth device address previously corresponding to the second wireless audio device and release a Bluetooth device address previously associated with the first wireless audio device. In some examples, the device role switch manager 720 may assume a Bluetooth slave role previously held by the second wireless audio device and release a Bluetooth master device role previously held by the first wireless audio device. In some examples, the device role switch manager 720 may release an ACL connection with the source device and an eSCO connection with the source device.

In some examples, the device role switch manager 720 may assume a Bluetooth device address previously corresponding to the first wireless audio device and release a Bluetooth device address previously associated with the second wireless audio device. In some examples, the device role switch manager 720 may release a Bluetooth slave role previously held by the second wireless audio device and assume a Bluetooth master device role previously held by the first wireless audio device. In some examples, the device role switch manager 720 may assume an ACL connection with the source device and an eSCO connection with the source device.

In some cases, the role switch trigger includes a physical distance between the first wireless audio device and the source device satisfying a threshold, a power balance between the first wireless audio device and the source device satisfying a threshold, a link quality between the first wireless audio device and the source device satisfying a threshold, or a combination thereof.

In some cases, the device role switch message includes a single message, and performing the role switch occurs instantaneously. In some cases, the device role switch message includes a set of messages, and where performing the role switch occurs incrementally in response to the set of messages. In some cases, the device role switch message includes a single message, and performing the role switch occurs instantaneously. In some cases, the device role switch message includes a set of messages, and where performing the role switch occurs incrementally in response to the set of messages.

The sniffing manager 725 may sniff, based on the role switch, air traffic from the source device to the second wireless audio device. In some examples, the sniffing manager 725 may sniff air traffic between a source device and the first wireless audio device.

The traffic enabler 735 may enable a traffic flow between the source device and the second wireless audio device.

The timing manager 730 may identify a gap period during which no communication is expected from the source device. In some cases, the gap period includes a coexistence window during which the source device performs wireless communication with another device, via another wireless communication protocol, or a combination thereof.

Figure 8:
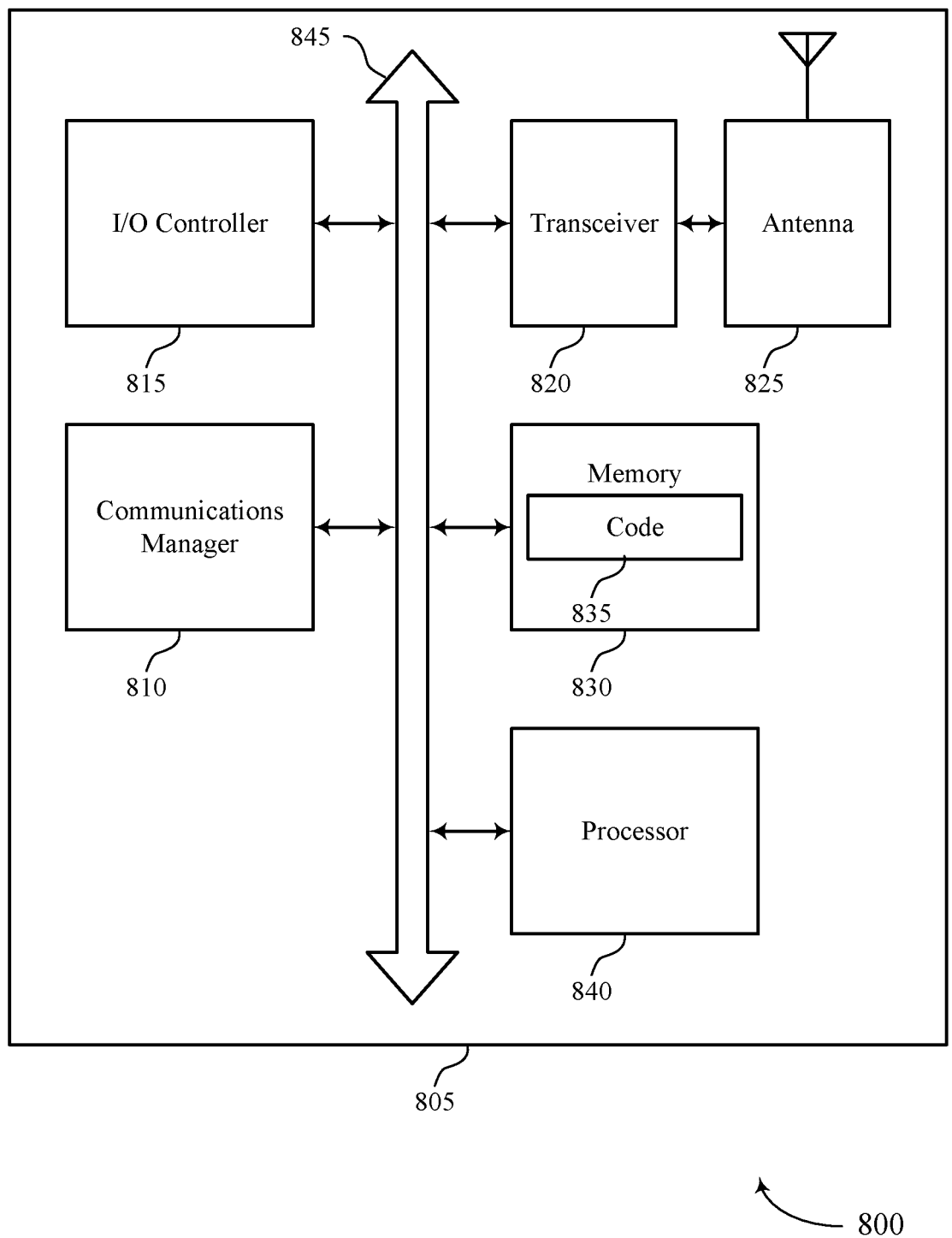
FIG. 8 shows a diagram of a system including a device that supports seamless link transfers between primary and secondary devices in accordance with aspects of the present disclosure.

FIG. 8 shows a diagram of a system 800 including a device 805 that supports seamless link transfers between primary and secondary devices in accordance with aspects of the present disclosure. The device 805 may be an example of or include the components of device 505, device 605, or a device as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may disable a traffic flow between a source device and the first wireless audio device, transmit, based on disabling the traffic flow, synchronization information and timing information to a second wireless audio device, transmit, based on transmitting the synchronization information and the timing information, a device role switch message indicating a device role switch between the first wireless audio device and the second wireless audio device, perform, based on the device role switch message, the role switch, and sniff, based on the role switch, air traffic from the source device to the second wireless audio device. The communications manager 810 may also sniff air traffic between a source device and the first wireless audio device, receive, from the first wireless audio device, synchronization information and timing information, receive, based on receiving the synchronization information and timing information, a device role switch message from the first wireless audio device, the device role switch message indicating a device role switch between the second wireless audio device and the first wireless audio device, perform, based on the device role switch message, the role switch, and enable a traffic flow between the source device and the second wireless audio device.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting seamless link transfers between primary and secondary devices).

The code 835 may include instructions to implement aspects of the present disclosure, including instructions to support wireless communications at a wireless audio device. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
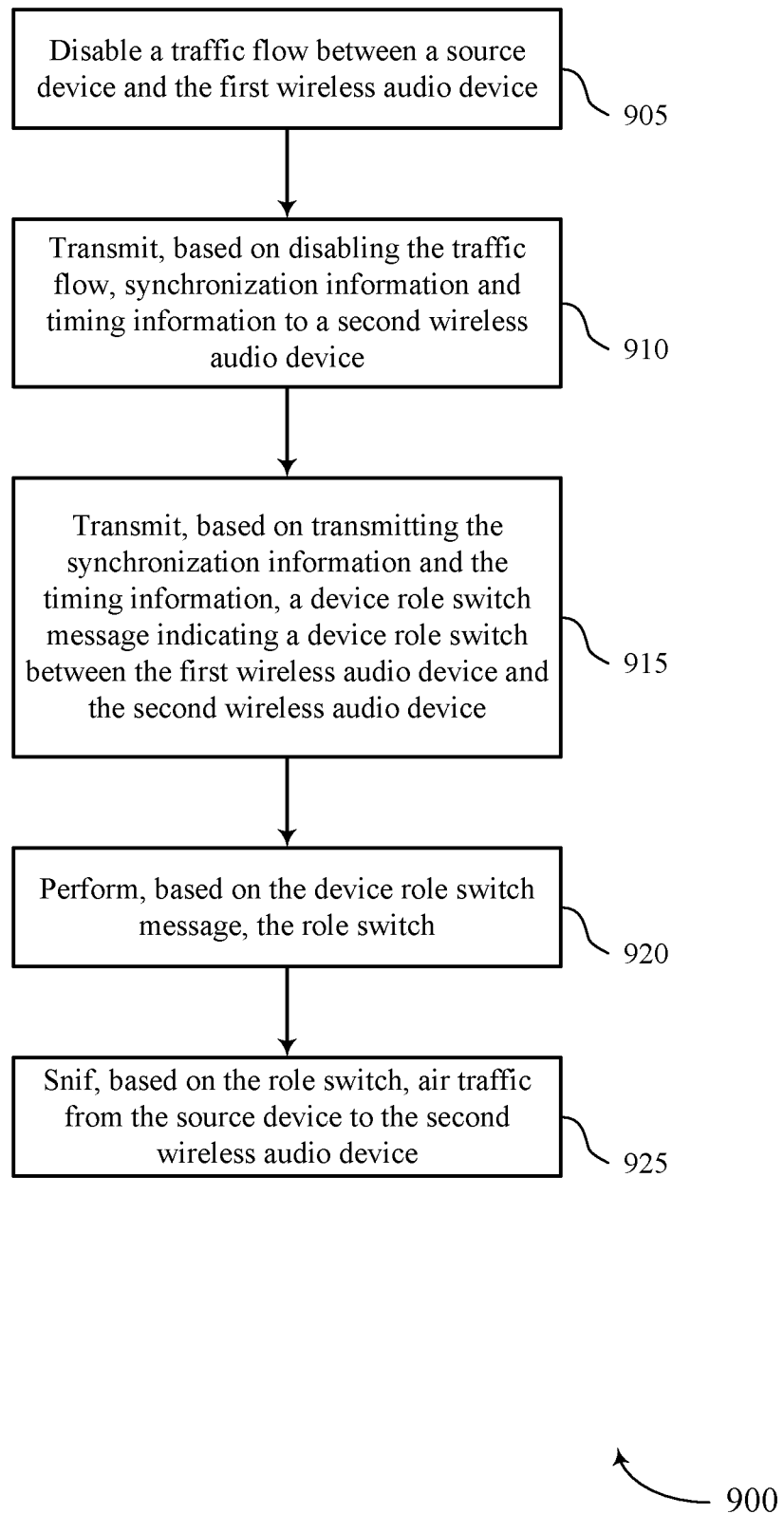
FIGS. 9 and 10 show flowcharts illustrating methods that support seamless link transfers between primary and secondary devices in accordance with aspects of the present disclosure.

FIG. 9 shows a flowchart illustrating a method 900 that supports seamless link transfers between primary and secondary devices in accordance with aspects of the present disclosure. The operations of method 900 may be implemented by a device or its components as described herein. For example, the operations of method 900 may be performed by a communications manager as described with reference to FIGS. 5 through 8. In some examples, a device may execute a set of instructions to control the functional elements of the device to perform the functions described below. Additionally, or alternatively, a device may perform aspects of the functions described below using special-purpose hardware.

At 905, the device may disable a traffic flow between a source device and the first wireless audio device. The operations of 905 may be performed according to the methods described herein. In some examples, aspects of the operations of 905 may be performed by a traffic disabler as described with reference to FIGS. 5 through 8.

At 910, the device may transmit, based on disabling the traffic flow, synchronization information and timing information to a second wireless audio device. The operations of 910 may be performed according to the methods described herein. In some examples, aspects of the operations of 910 may be performed by an information manager as described with reference to FIGS. 5 through 8.

At 915, the device may transmit, based on transmitting the synchronization information and the timing information, a device role switch message indicating a device role switch between the first wireless audio device and the second wireless audio device. The operations of 915 may be performed according to the methods described herein. In some examples, aspects of the operations of 915 may be performed by a device role switch manager as described with reference to FIGS. 5 through 8.

At 920, the device may perform, based on the device role switch message, the role switch. The operations of 920 may be performed according to the methods described herein. In some examples, aspects of the operations of 920 may be performed by a device role switch manager as described with reference to FIGS. 5 through 8.

At 925, the device may sniff, based on the role switch, air traffic from the source device to the second wireless audio device. The operations of 925 may be performed according to the methods described herein. In some examples, aspects of the operations of 925 may be performed by a sniffing manager as described with reference to FIGS. 5 through 8.

Figure 10:
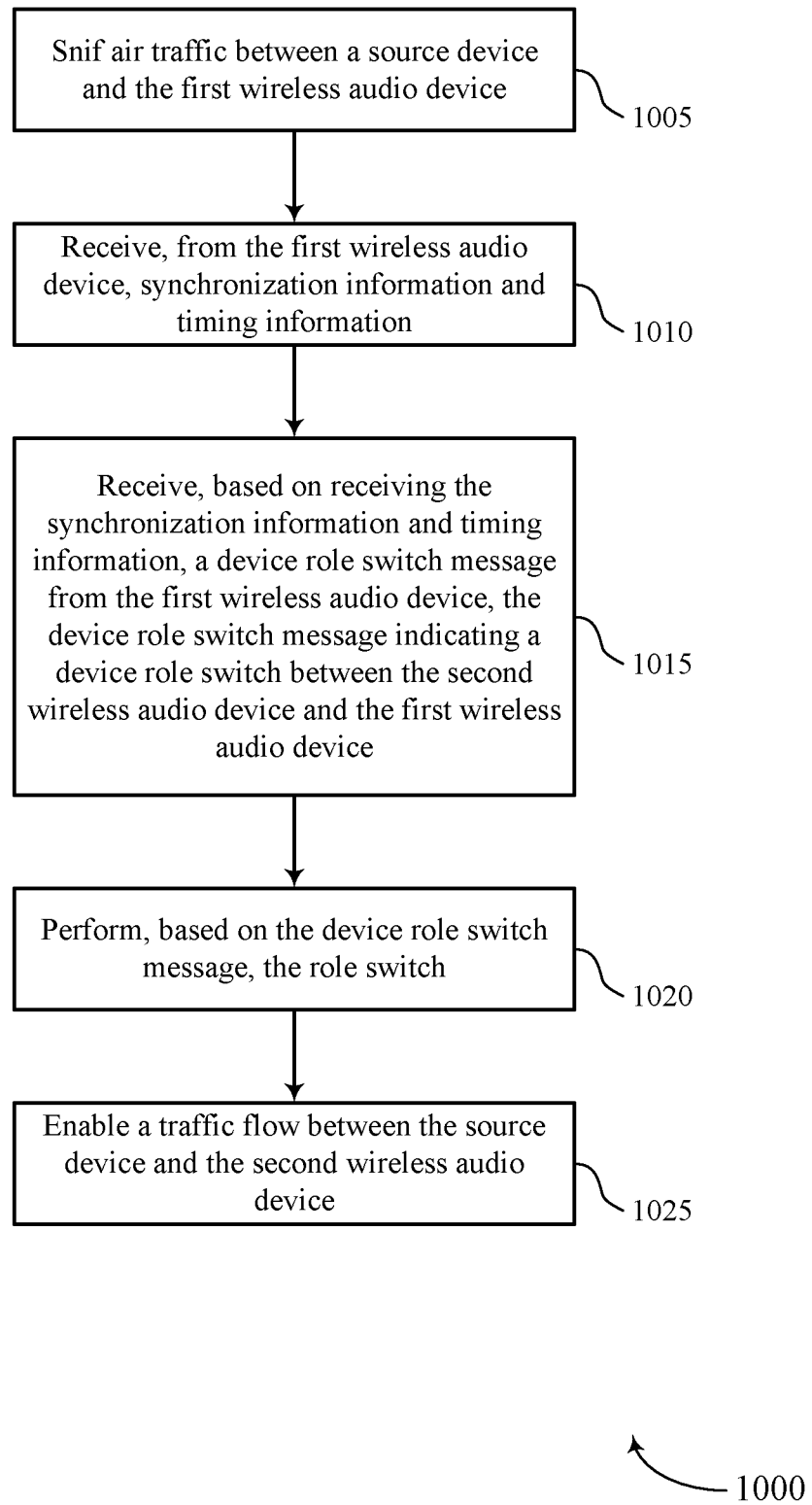

FIG. 10 shows a flowchart illustrating a method 1000 that supports seamless link transfers between primary and secondary devices in accordance with aspects of the present disclosure. The operations of method 1000 may be implemented by a device or its components as described herein. For example, the operations of method 1000 may be performed by a communications manager as described with reference to FIGS. 5 through 8. In some examples, a device may execute a set of instructions to control the functional elements of the device to perform the functions described below. Additionally, or alternatively, a device may perform aspects of the functions described below using special-purpose hardware.

At 1005, the device may sniff air traffic between a source device and the first wireless audio device. The operations of 1005 may be performed according to the methods described herein. In some examples, aspects of the operations of 1005 may be performed by a sniffing manager as described with reference to FIGS. 5 through 8.

At 1010, the device may receive, from the first wireless audio device, synchronization information and timing information. The operations of 1010 may be performed according to the methods described herein. In some examples, aspects of the operations of 1010 may be performed by an information manager as described with reference to FIGS. 5 through 8.

At 1015, the device may receive, based on receiving the synchronization information and timing information, a device role switch message from the first wireless audio device, the device role switch message indicating a device role switch between the second wireless audio device and the first wireless audio device. The operations of 1015 may be performed according to the methods described herein. In some examples, aspects of the operations of 1015 may be performed by a device role switch manager as described with reference to FIGS. 5 through 8.

At 1020, the device may perform, based on the device role switch message, the role switch. The operations of 1020 may be performed according to the methods described herein. In some examples, aspects of the operations of 1020 may be performed by a device role switch manager as described with reference to FIGS. 5 through 8.

At 1025, the device may enable a traffic flow between the source device and the second wireless audio device. The operations of 1025 may be performed according to the methods described herein. In some examples, aspects of the operations of 1025 may be performed by a traffic enabler as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first wireless audio device, comprising:
    disabling a traffic flow between a source device and the first wireless audio device;
    transmitting, based at least in part on disabling the traffic flow, synchronization information and timing information to a second wireless audio device;
    transmitting, based at least in part on transmitting the synchronization information and the timing information, a device role switch message indicating a device role switch between the first wireless audio device and the second wireless audio device;
    performing, based at least in part on the device role switch message, the role switch, wherein performing the role switch comprises assuming a Bluetooth device address previously associated with the first wireless audio device, assuming a Bluetooth slave role previously held by the second wireless audio device and releasing a Bluetooth master device role previously held by the first wireless audio device, and releasing an asynchronous connection-less (ACL) connection with the source device and an extended synchronous connection oriented (eSCO) connection with the source device; and
    sniffing, based at least in part on the role switch, air traffic from the source device to the second wireless audio device.

2. The method of claim 1, further comprising:
identifying a role switch trigger, wherein disabling traffic flow is based at least in part on identifying the role switch trigger.

3. The method of claim 2, wherein the role switch trigger comprises a physical distance between the first wireless audio device and the source device satisfying a threshold, a power balance between the first wireless audio device and the source device satisfying a threshold, a link quality between the first wireless audio device and the source device satisfying a threshold, or a combination thereof.

4. The method of claim 1, wherein disabling traffic flow further comprises:
identifying a gap period during which no communication is expected from the source device; and
disabling the traffic flow during the gap period.

5. The method of claim 4, wherein the gap period comprises a coexistence window during which the source device performs wireless communication with another device, via another wireless communication protocol, or a combination thereof.

6. The method of claim 1, wherein disabling traffic flow further comprises:
receiving one or more data packets from the source device; and
sending one or more negative acknowledgement (NACK) messages to the source device in response to the one or more data packets.

7. The method of claim 1, wherein disabling traffic flow further comprises:
receiving one or more data packets from the source device; and
refraining from sending an acknowledgement (ACK) message to the source device in response to the one or more data packets.

8. The method of claim 1, further comprising transmitting control state information to the second wireless audio device, wherein:
transmitting the device role switch message is based at least in part on the control state information.

9. The method of claim 8, wherein the control state information comprises Bluetooth upper layer information, data structure information, or a combination thereof.

10. The method of claim 1, wherein the device role switch message comprises a single message, and performing the role switch occurs instantaneously.

11. The method of claim 1, wherein the device role switch message comprises a plurality of messages, and wherein performing the role switch occurs incrementally in response to the plurality of messages.

12. A method for wireless communications between a first wireless audio device and a second wireless audio device at the second wireless audio device, comprising:
sniffing air traffic between a source device and the first wireless audio device;
receiving, from the first wireless audio device, synchronization information and timing information;
receiving, based at least in part on receiving the synchronization information and the timing information, a device role switch message from the first wireless audio device, the device role switch message indicating a device role switch between the second wireless audio device and the first wireless audio device;
performing, based at least in part on the device role switch message, the role switch, wherein performing the role switch comprises assuming a Bluetooth device address previously corresponding to the first wireless audio device and releasing a Bluetooth device address previously associated with the second wireless audio device, releasing a Bluetooth slave role previously held by the second wireless audio device and assuming a Bluetooth master device role previously held by the first wireless audio device, and assuming an asynchronous connection-less (ACL) connection with the source device and an extended synchronous connection oriented (eSCO) connection with the source device; and
enabling a traffic flow between the source device and the second wireless audio device.

13. The method of claim 12, further comprising receiving control state information from the first wireless audio device, wherein:
receiving the device role switch message is based at least in part on the control state information.

14. The method of claim 13, wherein the control state information comprises Bluetooth upper layer information, data structure information, or a combination thereof.

15. The method of claim 12, wherein the device role switch message comprises a single message, and performing the role switch occurs instantaneously.

16. The method of claim 12, wherein the device role switch message comprises a plurality of messages, and wherein performing the role switch occurs incrementally in response to the plurality of messages.

17. An apparatus for wireless communications at a first wireless audio device, comprising:
a processor,
memory in electronic communication with the processor; and
instructions stored in the memory and executable by the processor to cause the apparatus to:
disable a traffic flow between a source device and the first wireless audio device;
transmit, based at least in part on disabling the traffic flow, synchronization information and timing information to a second wireless audio device;
transmit, based at least in part on transmitting the synchronization information and the timing information, a device role switch message indicating a device role switch between the first wireless audio device and the second wireless audio device;
perform, based at least in part on the device role switch message, the role switch; and
sniff, based at least in part on the role switch, air traffic from the source device to the second wireless audio device.

* * * * *